United States Patent
Takahashi et al.

(10) Patent No.: US 6,881,124 B2
(45) Date of Patent: Apr. 19, 2005

(54) METHOD OF MANUFACTURING MAGNETIC HEAD

(75) Inventors: Toshio Takahashi, Yokohama (JP);
Hiromu Chiba, Yokohama (JP);
Takateru Seki, Yokohama (JP);
Hideaki Tanaka, Yokohama (JP);
Toshio Tamura, Yokohama (JP);
Minoru Yamasaka, Chigasaki (JP);
Akio Takakura, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 199 days.

(21) Appl. No.: 10/024,962

(22) Filed: Dec. 18, 2001

(65) Prior Publication Data

US 2002/0126421 A1 Sep. 12, 2002

(30) Foreign Application Priority Data

Mar. 8, 2001 (JP) .......................... 2001-064338
Aug. 2, 2001 (JP) .......................... 2001-234358

(51) Int. Cl.$^7$ .......................... B24B 7/22; B24B 51/00
(52) U.S. Cl. .................. 451/5; 451/28; 451/58
(58) Field of Search ............................ 451/5, 8, 10, 28, 451/57, 58; 29/603.12, 603.15, 603.16

(56) References Cited

U.S. PATENT DOCUMENTS 5,749,769 A * 5/1998 Church et al. .................. 451/5

FOREIGN PATENT DOCUMENTS

JP  02-95572  4/1990
JP  2000-158335  6/2000

* cited by examiner

Primary Examiner—Robert A. Rose
(74) Attorney, Agent, or Firm—Townsend and Townsend and Crew LLP

(57) ABSTRACT

An L-shaped slide plate mounted with a workpiece holding device on a slide guide is firmly attached to an angle adjustment mechanism, and a reciprocating motion drive unit mounted with the angle adjustment mechanism on a slider table is firmly attached to a bridge so that an angle between a surface of a workpiece to be lapped and a surface of a lapping plate is kept substantially constant, and also the bridge is disposed so as to stride the lapping plate. Thereby, in a state of row bar in which a plurality of magnetic head sliders run in a line, an air bearing surface of magnetic head can be lapped with high accuracy with an element recession being decreased and an occurrence of a scratch being restrained.

14 Claims, 18 Drawing Sheets

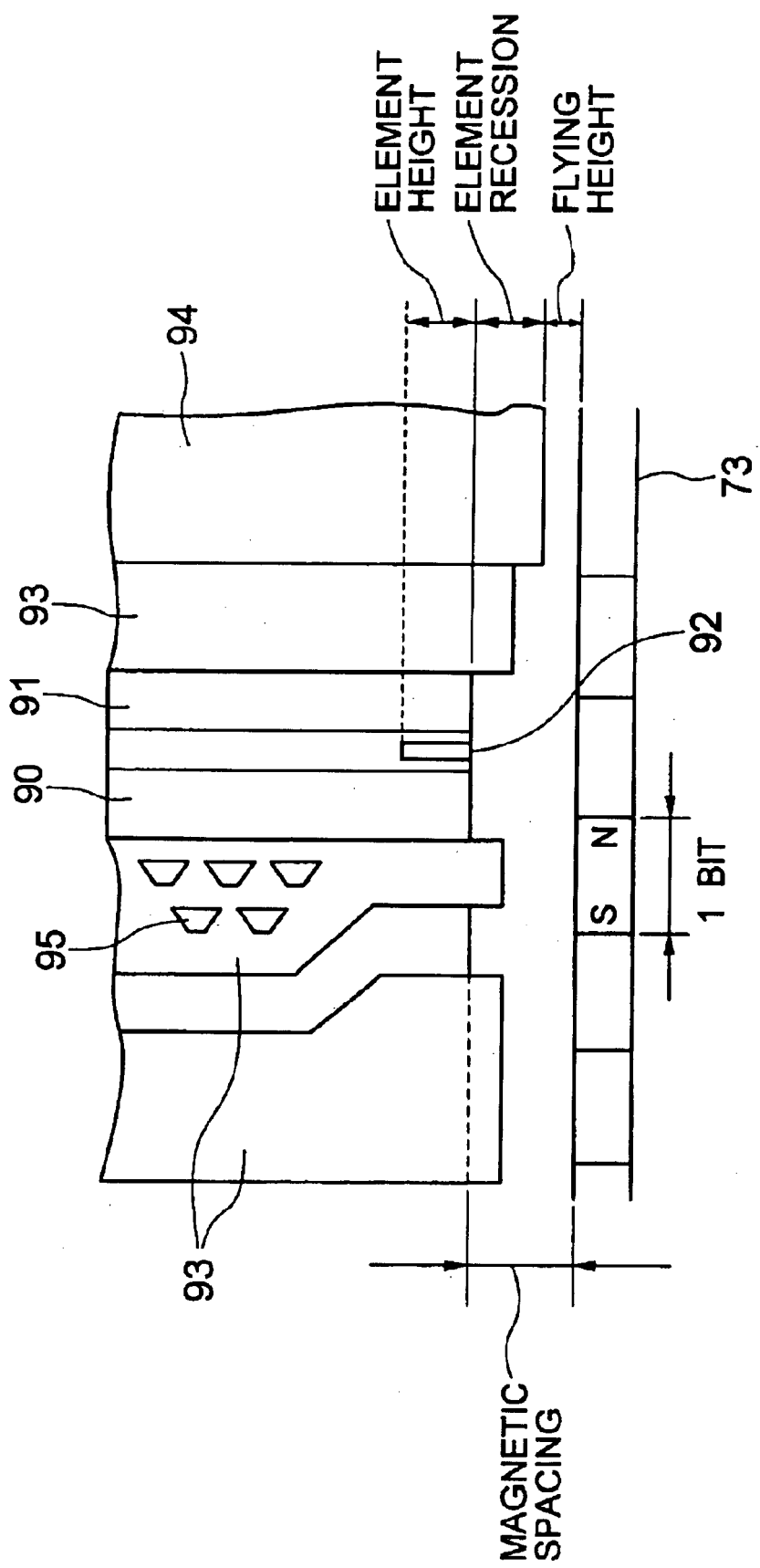

$\theta = \tan^{-1}(D/Twr)$

TABLE 1

|  | MEAN VALUE (nm) | STANDARD DEVIATION (nm) |
|---|---|---|
| ELEMENT HEIGHT DISTRIBUTION BEFORE LAPPING | 331.9 | 34.7 |
| ELEMENT HEIGHT DISTRIBUTION AFTER LAPPING | 301.2 | 37.0 |
| LAPPING AMOUNT DISTRIBUTION | 30.7 | 2.9 |

METHOD OF MANUFACTURING MAGNETIC HEAD

BACKGROUND OF THE INVENTION

This invention relates to a magnetic head for performing recording and reproduction of information while moving relatively with respect to a magnetic medium such as a magnetic disk, and a lapping method thereof, and a magnetic disk drive unit using the magnetic head.

In recent years, in a magnetic disk drive unit, recording density has been rapidly improved. Accordingly, it has been demanded that an air bearing height of the magnetic head with respect to the magnetic recording medium should be decreased to the utmost.

As shown in FIG. 7, the magnetic disk drive unit is completed by combining magnetic heads 70, each of which is fixed to a support spring 74, with magnetic disks 73, which are recording medium. Magnetically recorded information is written and read by means of the magnetic head 70 that moves over the rotating magnetic disks 73 by means of a drive unit 75.

In order to create an air bearing surface of magnetic head for realizing such a small air bearing height, lapping operation is generally performed. The lapping operation is usually performed on a soft metallic surface plate. Specifically, as shown in FIG. 8, a head (not shown) bonded to a lapping jig is pressedly slid while a lapping fluid (slurry 80) mainly containing hard abrasives such as diamond is dripped onto a rotating soft metallic lapping surface plate 8 via a slurry supply tube 81, by which lapping operation is performed by abrasives embedded in the lapping plate 8 or rolling abrasives rolling between the lapping plate and the head. A conditioning ring 9 is used to maintain the flatness of the soft metallic lapping plate 8 during the lapping operation.

In the magnetic head using a magneto-resistive (MR) or giant-magneto-resistive (GMR) head to read a signal, it is necessary to precisely machine the element height of an MR or GMR element that is important for reproduction characteristics. At present, a method described in JP-A-2-95572 specification is used to control this element height. Specifically, in this method, the lapping amount during lapping operation is always monitored by using a lapping amount detecting element, and the monitored result is fed back to a lapping apparatus, by which lapping is performed while the bend and inclination of the alignment of the elements in a row bar is controlled.

SUMMARY OF THE INVENTION

However, since lapping of as much as about 15 µm must be performed in the above-described lapping method of prior art, it is necessary to continuously drip slurry containing loose abrasives in order to increase the lapping efficiency for reasonable rate of throughput. Specifically, the lapping operation is carried on at a lapping rate of about 1 µm/min by continuously dripping loose abrasives from the beginning of lapping to a point about 1 µm before the target dimension. Then, the dripping of loose abrasives is stopped once, and the dripping operation is switched to the dripping of lubricating oil only. Subsequently, the relative speed of a workpiece with respect to a lapping plate is decreased to about several percents of the previous rate, by which lapping operation is performed at a low lapping rate of not more than 0.1 µm/min.

In this case, contrivance has also been made such that just before the rough lapping operation using loose abrasives is shifted to the finish lapping operation using lubricating oil only, loose abrasives remaining on a lapping plate are wiped off or other measures are taken. However, in the case where lapping operation is continued on the same lapping plate, it is difficult to completely remove the loose abrasives before moving on to the finish lapping. In the above-described method, therefore, the influence of loose abrasives are exerted easily even at the stage of finish lapping operation, so that a decrease in the element recession is limited. Also, this lapping method is nothing like satisfactory from the viewpoint of considerably decreasing the surface roughness of element surface formed by lapping and the occurrence of scratches and the like.

FIG. 9 is a sectional view of a magnetic head slider. At present, an air bearing height of magnetic head of about not more than 10 µm is demanded. A large recession of element portion, as a result of lapping rate difference for different materials, a difference in height between the faces of shields 90 and 91 and the face of a ceramic substrate 94 on the air bearing surface side of magnetic head means that the gap between a medium (not shown) and a magneto-resistive element 92 is wide. Therefore, even an element recession as small as several nanometers becomes a serious hindrance to the demand for decreasing the air bearing height.

For this reason, the finish lapping operation of air bearing surface is sometimes performed after the above-described lapping operation has been finished.

To meet the demand for improving the manufacturing efficiency, this finishing process (subsequent process) is also performed in a state of row bar (FIG. 11), which is a work in process of magnetic head slider, so that this process is referred to as "bar touch lapping".

The method in which finish lapping is performed in a separate process as described above has been disclosed in JP-A-2000-158335 specification. With this method, in many cases, a workpiece holding jig mounted with a row bar is slid on a lapping plate in random directions, by which the surface roughness of the whole lapping surface is decreased. In the lapping apparatus for realizing this method, the workpiece holding jig is made capable of swinging in a freely movable state with respect to a support mechanism thereof. The jig is placed on the surface plate, and after the parallelism between the surface of workpiece and the surface of lapping plate is provided, the workpiece holding jig is pressed from the upside. Thereafter, the workpiece holding jig reciprocates over the lapping plate in a radial direction, by which lapping operation is performed by a relative sliding. motion combining the reciprocating motion with the rotating motion of surface plate.

In this case, the support mechanism that applies a pressing load to the workpiece holding jig is designed so that even if the direction of the longitudinal axis of support mechanism is shifted from the direction of the normal axis of surface of lapping plate by the above-described reciprocating mechanism at the stage before the workpiece is brought into contact with the lapping plate, the parallelism between the surface of workpiece and the surface of lapping plate is maintained by natural self-adjustment.

However, in the case where lapping operation is performed by moving the row bar in random directions as described above, as shown in FIG. 12A, scratches crossing the upper shield 90 and lower shield 91, or sometimes scratches crossing an GMR element film itself are formed, and thus electrical short-circuit paths are formed between the upper and lower shields or in the GMR element film, so that the function of magnetic head is lost.

Also, as described above, in the case where the workpiece holding jig and the support mechanism thereof are connected to each other by the reciprocating mechanism, at the reversing time of reciprocating motion of workpiece, a frictional force in the shearing direction applied to the surface of workpiece is also reversed. Thereby, the distribution of lapping load applied to the workpiece during lapping operation is made nonuniform in the bar, and thus the lapping amount of each element aligned in the bar is also made nonuniform.

In general, the workpiece is installed to the workpiece holding jig via a rubber-like elastic sheet, and acts so that a uniform contact is maintained with respect to the lapping plate. However, the lapping load applied to the workpiece may become not uniform and not constant because of such as rattle in the reciprocating mechanism, elastic deformation of the support mechanism, or warp and torsion of the workpiece itself.

Also, in the case where positioning of the lapped surface of workpiece with respect to the surface of lapping plate is performed by the above-described reciprocating mechanism by using an actual workpiece, the uniformity of contact is checked by applying a load while keeping both members staying still before starting the lapping operation. At this time, abrasives protruding from the top surface of lapping plate are pressed on the contact surface of the work, so that a depression formed by the transfer of the shape of abrasives remains on the contact surface of workpiece.

The size of abrasives generally used is $1/8$ $\mu$m (125 nm) in nominal value, so that the height of protruding portion of abrasive grain held on the surface plate as a fixed abrasive grain is estimated to be several tens of nanometers. Since this height is roughly comparable to the lapping amount removed by the finish lapping operation, a depression formed by the pressing of abrasives against the contact surface of workpiece and scratches formed by the successive sliding motion are not removed completely and thus remains.

Furthermore, since the workpiece holding jig is supported by the reciprocating mechanism in a freely movable state, at the time of completion of lapping operation, it is necessary to separate the workpiece from the lapping plate after the relative sliding motion of them is stopped. However, since the load is still applied at this time, the profile of the abrasives protruding from the top surface of lapping plate are transferred to the lapped surface of workpiece, so that the smoothness of lapped surface is deteriorated.

An object of the present invention is to prevent the occurrence of scratches caused by the lapping operation in random directions as described above by performing lapping operation using a fixed abrasive lapping plate where loose abrasives are completely removed from the surface of the lapping plate. Another object thereof is to realize a smooth lapped surface in which variations in lapping amounts of elements aligned in a bar, which is a workpiece, are decreased, and there is no transfer of abrasive grain shape. Still another object thereof is to provide a lapping apparatus and lapping method that realize the above-described lapping operation.

To attain the above objects, the present invention provides a lapping apparatus for lapping a workpiece on a lapping plate, including a bridge provided so as to stride the lapping plate; a reciprocating motion drive unit having a slider table; a workpiece holding device for holding the workpiece; an angle adjustment mechanism with a locking mechanism for adjusting a relative orientation of the surface of the workpiece to be lapped and the surface of the lapping plate; and an L-shaped slide plate having a slide guide which is movable in a direction substantially perpendicular to the movement direction of the reciprocating motion drive unit. The lapping apparatus is configured so that the L-shaped slide plate mounted with the workpiece holding device on the slide guide is firmly attached to the angle adjustment mechanism, and the reciprocating motion drive unit mounted with the angle adjustment mechanism on the slider table is firmly attached to the bridge so that an angle between the surface of the workpiece and the surface of the lapping plate is kept substantially constant, so that the surface of the workpiece to be lapped is substantially parallel with the surface of the lapping plate.

The locking mechanism is used for fixing so that an angle or parallelism between the surface of the set workpiece to be lapped and the surface of the lapping plate is maintained during the time when the workpiece is being lapped, that is, the rigidity readings of the workpiece holding device with respect to the reciprocating motion direction of the reciprocating motion drive unit and to the rotation direction of the lapping plate are not less than 0.2 N/$\mu$m.

In the present invention, the workpiece is mounted to the workpiece holding device with a rubber-like elastic sheet being interposed therebetween and also via a detachable workpiece holding jig.

Also, the angle adjustment mechanism, which consists of a pair of angle adjustment portions driven in an arc form in the direction perpendicular to each other, enables three-dimensional adjustment of the relative position of the surface of the workpiece to be lapped and the surface of the lapping plate. Specifically, the angle adjustment mechanism, which consists of two gonio-stages stacked in two tiers so that the axis of rotation thereof is parallel with the surface of the lapping plate and an angle between two axes of rotation thereof is 90 degrees, adjusts the normal direction of the surface of the workpiece to be lapped three-dimensionally in the range of about ±15 degrees from the vertical direction with respect to the surface of the lapping plate, and fixes the relative orientation of the workpiece and the surface of the lapping plate by means of the locking mechanism.

Also, the present invention provides a method of manufacturing a magnetic head in which a workpiece having a plurality of magnetic heads is lapped on a lapping plate, including a process of lapping operation in which the surface of the workpiece to be lapped is lapped by using at least the reciprocating motion of the workpiece or the rotating motion of the lapping plate, in which during the time when the process of lapping operation is being performed, the workpiece is lapped while an angle between the surface of the workpiece to be lapped and the surface of the lapping plate is kept substantially constant or while the surface of the workpiece and the surface of the lupping plate are kept substantially parallel with each other.

The workpiece is lapped by using fixed abrasives such that a part of each abrasive is embedded in the lapping plate and remaining portion thereof is exposed on the lapping plate.

Also, in the present invention, the relative position of the surface of the workpiece to be lapped and the surface of the lapping plate is adjusted in advance, and during the time when the workpiece is being lapped, the workpiece is lapped while the relative position is kept. Also, after the above-described process of lapping is finished, the workpiece is lapped by using reciprocating motion of the workpiece with the rotational rate of the lapping plate being decreased to a predetermined range.

When the workpiece is brought close to and in contact with the surface of the lapping plate, the lapping plate is rotated and/or the workpiece is reciprocated prior to lapping operation, subsequently lapping operation being performed by the sliding motion of the workpiece on the lapping plate by bringing the workpiece into contact with the lapping plate, and at the time when lapping operation is finished, the workpiece is retracted from the lapping plate while the reciprocating motion of the workpiece is maintained.

By lapping the workpiece by using the above-described lapping apparatus, a magnetic head can be obtained in which a lapping trace having an angle of a predetermined range with respect to the lengthwise direction of a shield portion or a magneto-resistive element is formed on the air bearing surface of magnetic head in the workpiece, and/or the formation of lapping trace crossing the shield portion or the magneto-resistive element is decreased.

BRIEF DESCRIPTION OF THE DRAWINGS

These and other features, objects and advantages of the present invention will become more apparent from the following description when taken in conjunction with the accompanying drawings wherein:

FIG. 9 is an explanatory view for illustrating an element recession on an air bearing surface of magnetic head in which recording media are arranged in an opposed manner;

DETAILED DESCRIPTION OF PREFERRED EMBODIMENTS

One embodiment of the present invention will now be described in detail with reference to the accompanying drawings.

Figure 1:
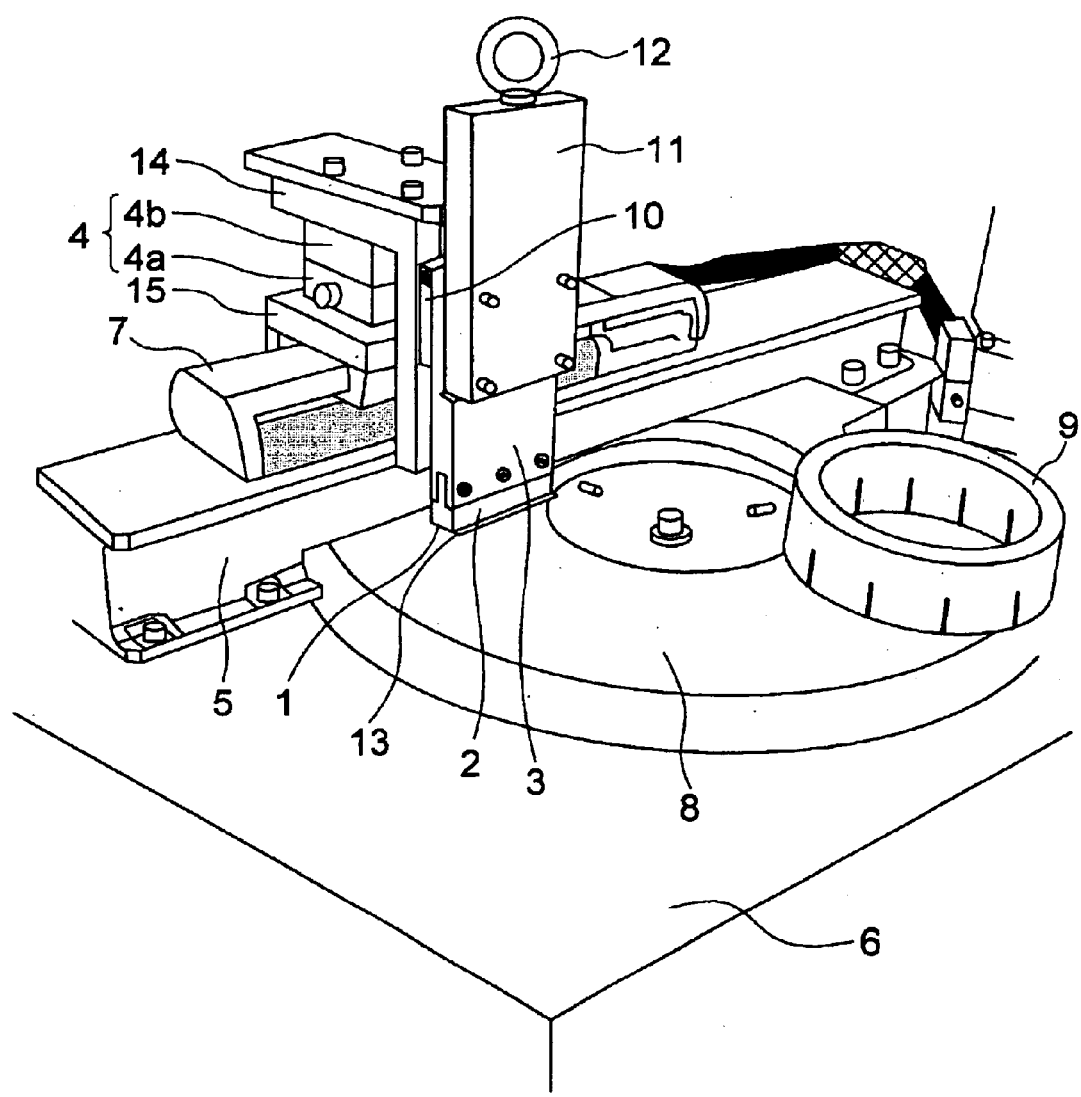
FIG. 1 is a schematic view for illustrating a lapping apparatus in accordance with the present embodiment.

FIGS. 1 to 6 show one embodiment of a lapping apparatus in accordance with the present invention. FIG. 1 is a schematic general view of a lapping apparatus of this embodiment. In FIG. 1, a bed 6 is provided with a disk-shaped lapping plate 8, and a bridge 5 is provided over the bed 6 in a form of striding the lapping plate 8. On the bridge 5, a reciprocating motion drive unit 7 consisting of a linear actuator is installed, and an angle adjustment mechanism 4 comprising two gonio-stages 4a and 4b is mounted on a slider table 15 of the reciprocating motion drive unit 7. One end of an L-shaped slide plate 14 is attached to the angle adjustment mechanism 4, and the other end thereof is attached to workpiece holding device 3 via a linear slide guide 10. Further, the workpiece holding device 3 is mounted with a detachable workpiece holding jig 2, and the workpiece holding jig 2 is mounted with a workpiece 1.

The relative orientation of the surface to be lapped of the workpiece 1 mounted on the workpiece holding jig 2 to the surface of the lapping plate 8 is adjusted by using the angle adjustment mechanism 4, and the two gonio-stages 4a and 4b are arranged so as to rotate about the axes perpendicular to each other. When angle adjustment of relative orientation is made, it is difficult to measure the actual orientation of the workpiece 1 during lapping operation. Therefore, instead, the relative orientation of the lower surface of the workpiece holding jig 2 for holding the workpiece 1 to the surface of the lapping plate 8 is adjusted in practice. Also, the configuration in which the bridge 5 and the bed 6 are made an integrally formed structure is in the scope of the present invention.

The lapping plate 8 is configured so as to be rotated horizontally with respect to the bed 6 by using a motor (not shown) provided within the bed 6. The top surface of the lapping plate 8, which serves as a lapping surface, is macroscopically machined so as to be a flat surface, and on the other hand, it is microscopically formed with an analog record like grooves each having a width of several tens of micrometers and a depth of several micrometers during the same machining operation. These grooves play a role of accelerating draining of lubricating fluid from the surface plate 8, by which the sliding motion of the workpiece 1 on the lapping plate 8 is stabilized.

Also, on the convex portion of groove, diamond abrasives with a diameter of about 100 nm, which are partially embedded by the later-described procedure, are densely arranged, and the surface of the workpiece 1 is lapped by using these abrasives. Although not shown in the drawing, a lubricating fluid vessel and a lubricating fluid supply mechanism are provided on the bed 6, and a lubricating fluid is dripped onto the top surface of the lapping plate 8 via a supply tube. A ceramic conditioning ring 9 is disposed on the lapping plate 8, and is rotated on the lapping plate 8 along with the rotation of the lapping plate 8 by being supported with a rotatable pulley. Thereby, the flatness of the surface of the lapping plate 8 is maintained, and at the same time, the lubricating fluid dripped onto the surface plate spreads uniformly.

Figure 2:
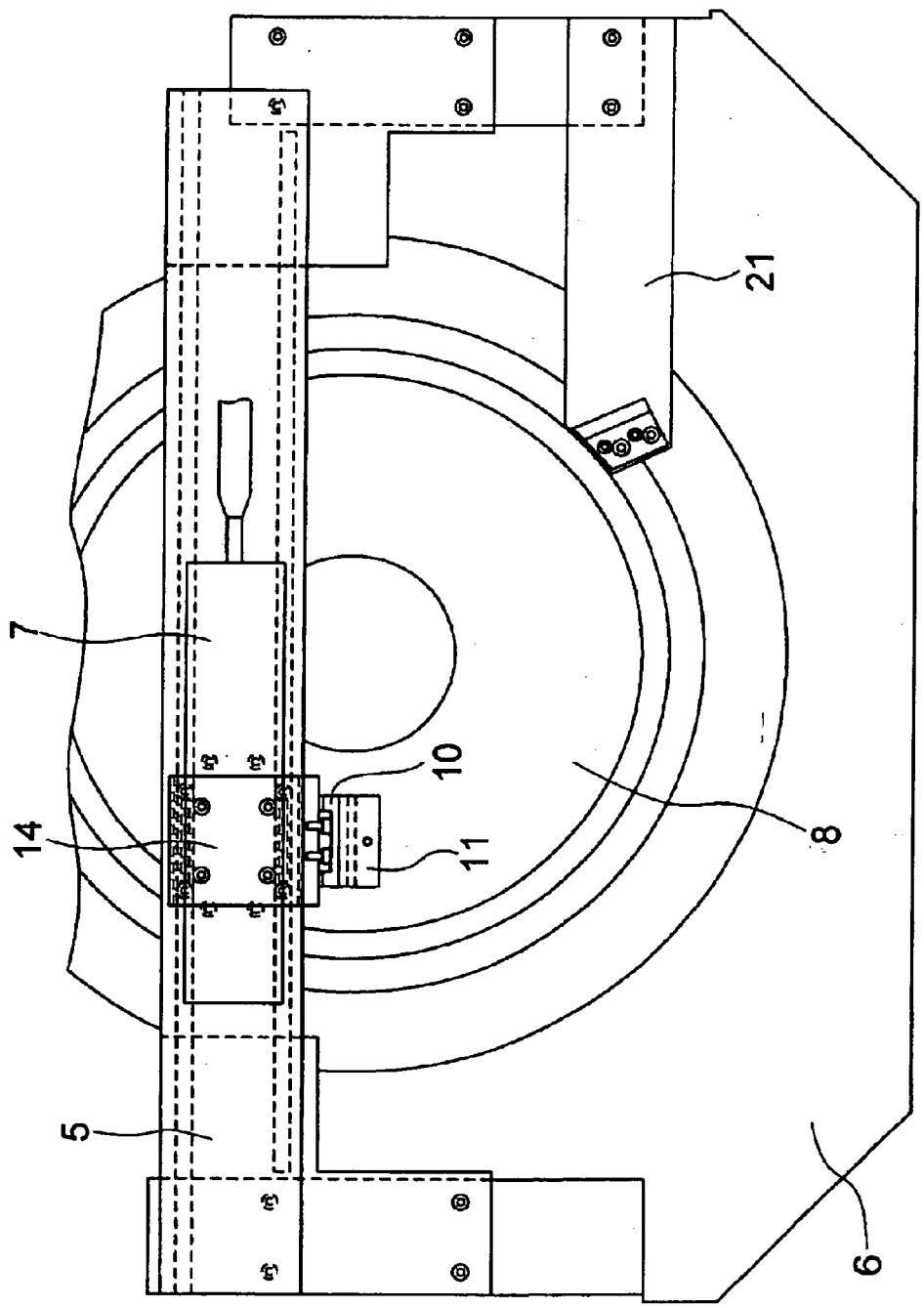
FIG. 2 is a schematic top view of a lapping apparatus in accordance with the present embodiment.
Figure 3:
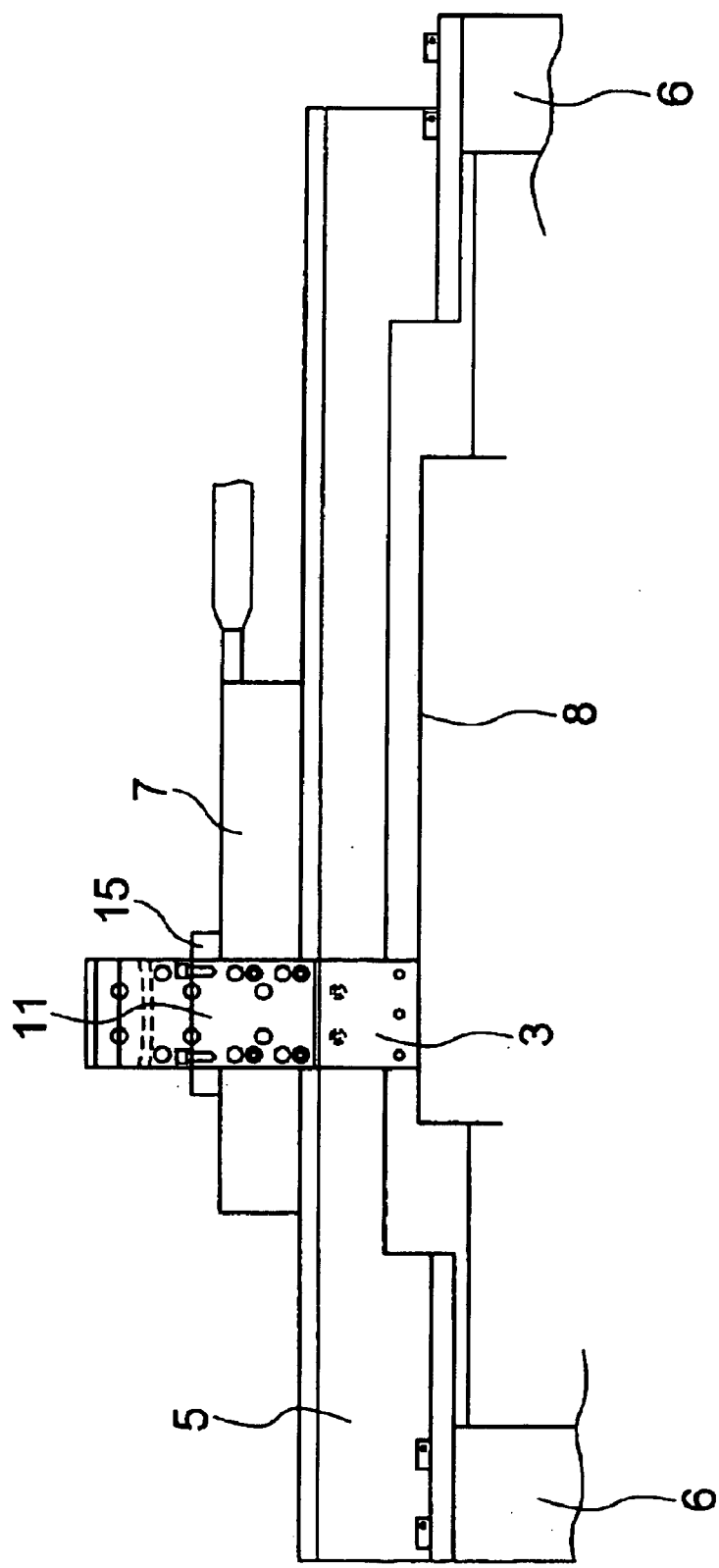
FIG. 3 is a schematic front view of a lapping apparatus in accordance with the present embodiment.
Figure 4:
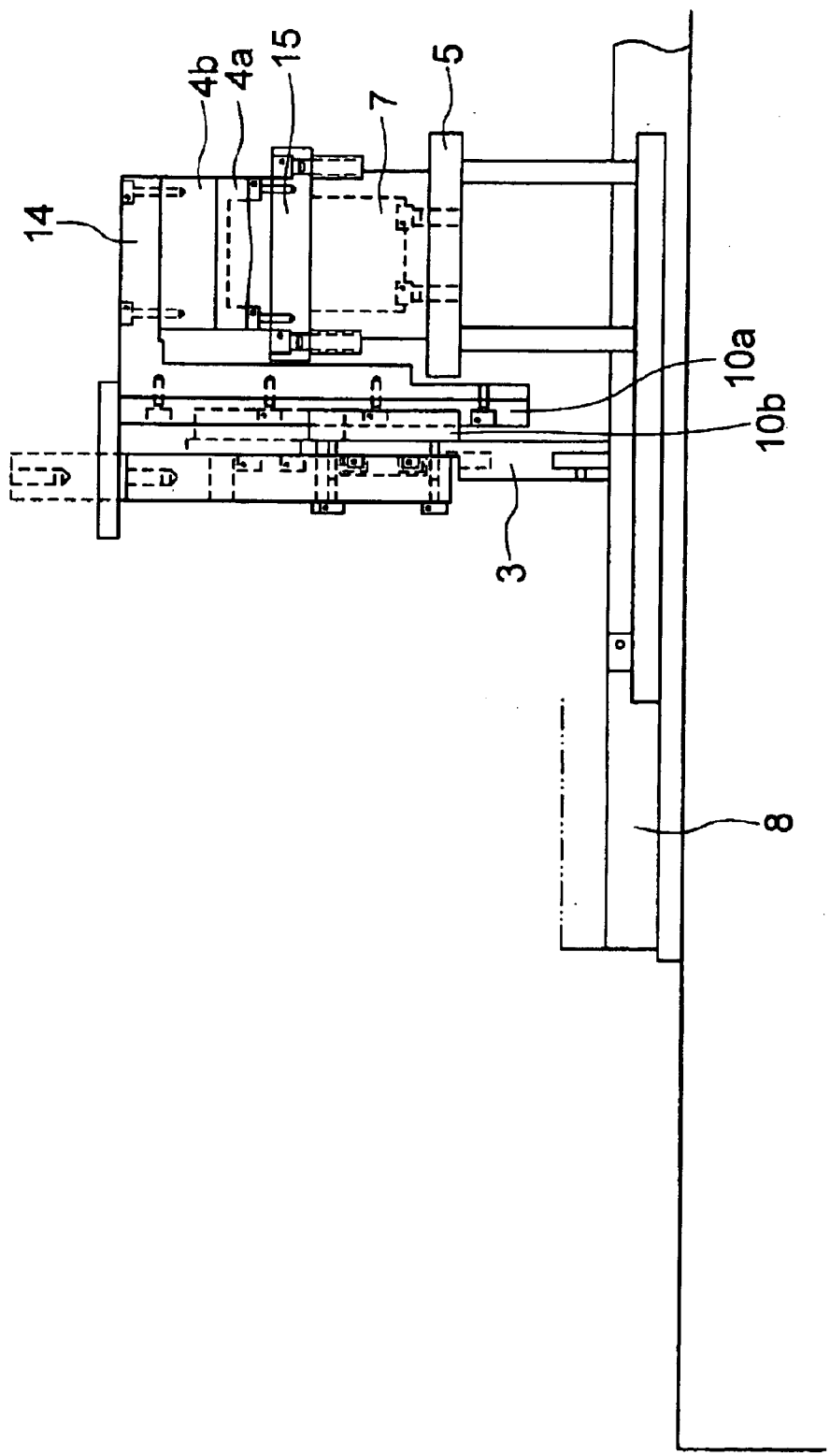
FIG. 4 is a schematic side view of a lapping apparatus in accordance with the present embodiment.

FIG. 2 is a top view of the lapping apparatus, FIG. 3 is a front view thereof, and FIG. 4 is a side view thereof. As apparent from these drawings, the highly rigid bridge 5 is provided on the bed 6 in a form of striding the lapping plate 8, and the reciprocating motion drive unit 7 having a ball screw type linear actuator is fixed on the bridge 5. The ball screw is directly connected to a rotating motor. By repeating the normal rotation and reverse rotation of this motor, the slider table 15 installed to the ball screw performs reciprocating linear motion on the bridge 5.

Also, as apparent from FIGS. 2 and 3, consideration is given so that the workpiece holding device 3 mounted via the angle adjustment mechanism 4 and the L-shaped slide plate 14 provided on the slider table 15 performs reciprocating motion along the diameter of the lapping plate 8 while keeping an equal clearance with respect to the surface of the lapping plate 8.

Figure 5:
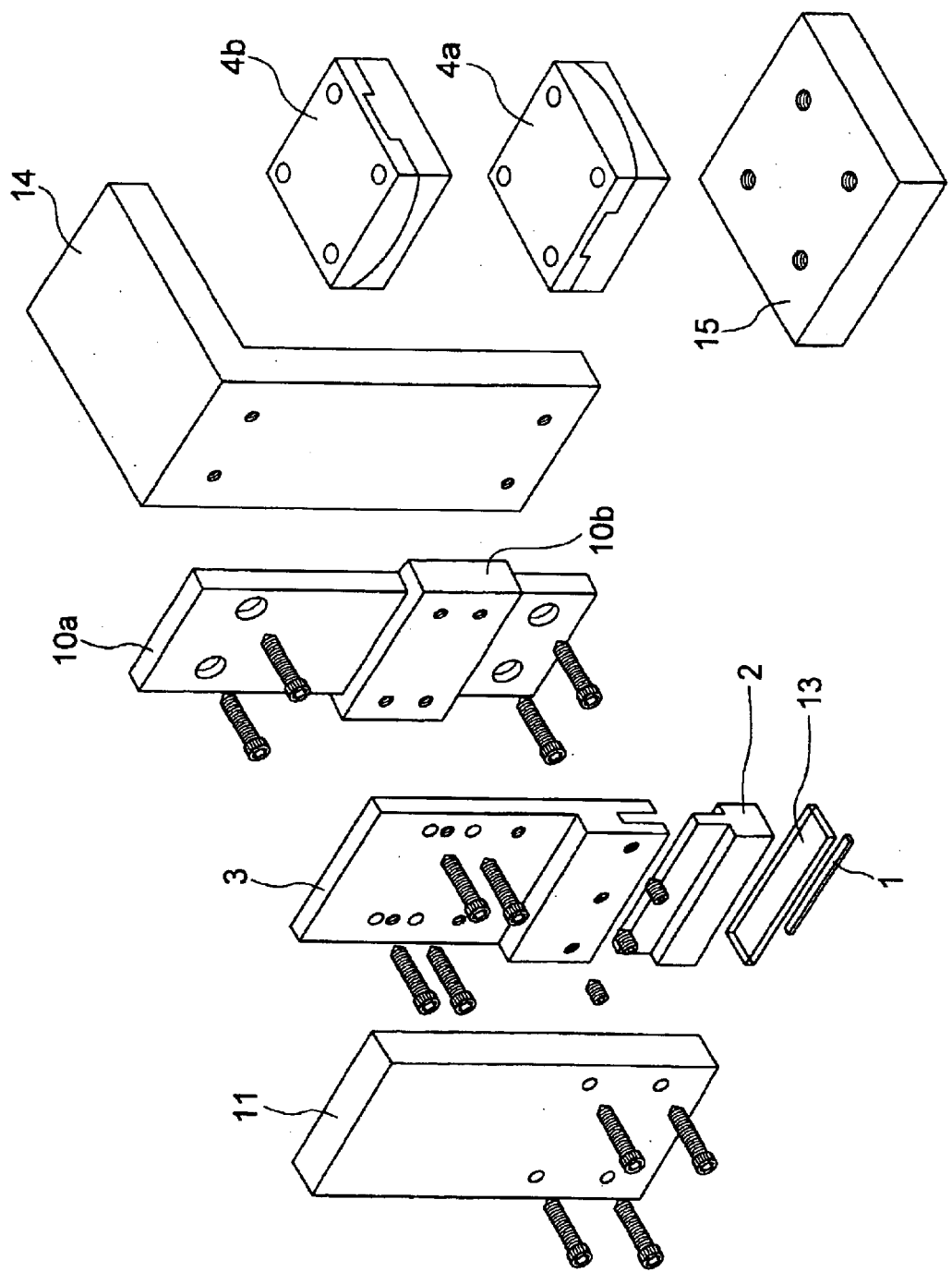
FIG. 5 is an assembly view of a workpiece holding device installed to an angle adjustment mechanism.

FIG. 5 is an assembly view of the workpiece holding device 3 capable of making angle adjustment. The slider table 15 is provided with the two gonio-stages (swivel stages) 4a and 4b, which are stacked on each other in two tiers, upper and lower, so that the axes of rotation of the gonio-stages are both parallel with the surface of the lapping plate 8, and an angle the two axes of rotation make is 90 degrees. These gonio-stages 4a and 4b each being capable of changing the direction of rotation within the range of about ±15 degrees. Thus, the normal direction of the surface of the workpiece 1 to be lapped can be adjusted three-dimensionally, so that the normal axis of the surface of the workpiece 1 to be lapped can be aligned precisely with that of the surface of the lapping plate 8 easily.

Also, the gonio-stages 4a and 4b each being mounted with a locking device (not shown), so that after the surface of the workpiece 1 to be lapped is set in an intended relative orientation with respect to the surface of the lapping plate 8, the axes of rotation of the gonio-stages 4a and 4b can be fixed in order to keep this state. For example, when the lapped surface of the workpiece 1 is set substantially in parallel with the surface of the lapping plate 8, the parallel relationship between them can be maintained even during the lapping operation.

Over the gonio-stages 4a and 4b stacked in two tiers, the L-shaped slide plate 14, which is a connecting member, is installed. On the other face of the L shape, the linear slide guide 10, which is a linear bearing, is installed. This linear slide guide 10 is formed by combining a guide portion 10a of linear slide guide, which is a beam-form member having grooves, with a U-shaped slide portion 10b formed so as to embrace the guide portion 10 via a plurality of bearing balls arranged along the aforementioned grooves. Thereby, smooth linear motion of the linear slide guide 10 can be realized, and at the same time, movement in any other directions can surely be restrained.

By arranging the linear slide guide 10 vertically with respect to the lapping plate 8, a lapping load is applied only in the vertical direction to the surface of the workpiece 1 to be lapped while a vertical positional change of the workpiece 1 caused by the rotation of the lapping plate 8 and the reciprocating motion of the workpiece 1 can be absorbed. Therefore, not only the parallel relationship between the surface of the workpiece 1 to be lapped and the surface of the lapping plate 8 can be maintained even during the relative sliding motion, but also the parallel relationship between them can be maintained even at the moment when the motion is reversed, where it is very difficult to maintain the parallel relationship therebetween.

The maintenance of parallel relationship between them means that before and after the movement direction of the workpiece 1 is reversed, the angle of the normal axis of the surface of the workpiece 1 to be lapped with respect to the normal axis of the surface of the lapping plate 8 is kept in the range of not less than 0° and not more than 0.006°. Specifically, the deviation could be kept at a value of not more than 5 $\mu$m or less with respect to the longitudinal length of 50 mm of the workpiece 1, so that the deviation angle $\alpha$ could be kept in the range not more than $\tan^{-1}$ (5 $\mu$m/50 mm)=0.00573°.

When the workpiece 1 is performing linear motion, the relative orientation of the surface of the workpiece 1 to be lapped or the lower face of the workpiece holding jig 2 and the surface of the lapping plate 8 is substantially the parallel direction (0°).

Figure 6:
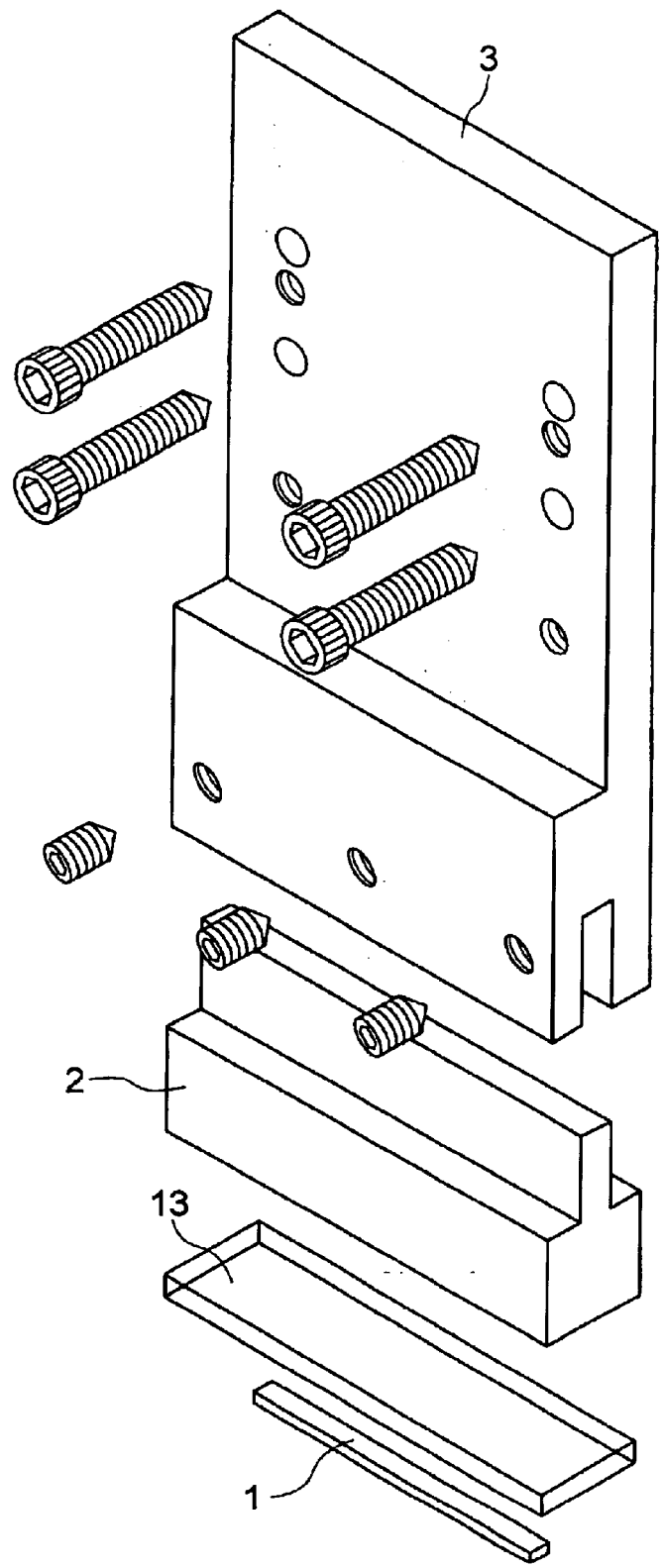
FIG. 6 is an assembly view of a workpiece holding device.
Figure 7:
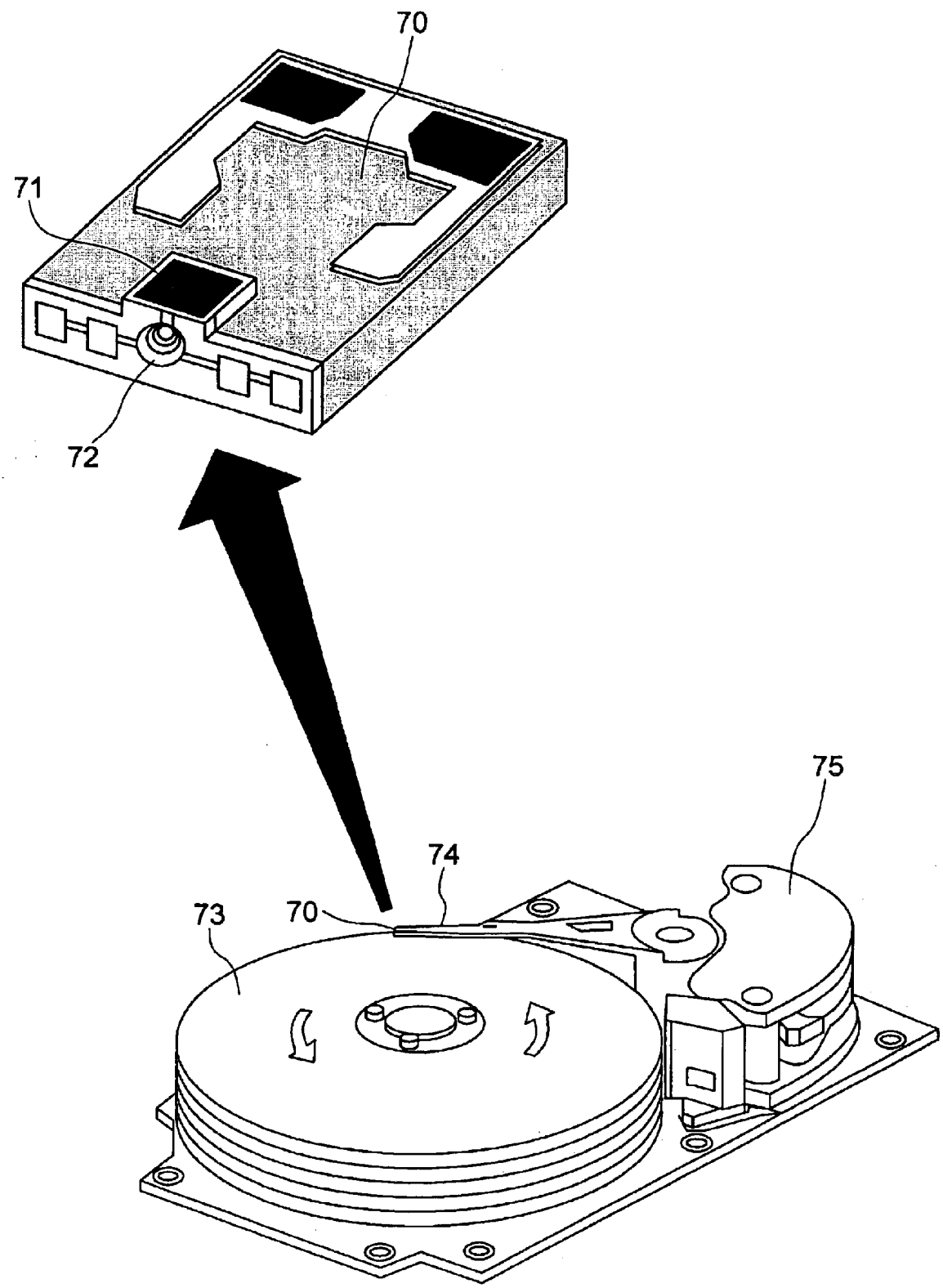
FIG. 7 is a schematic view of a magnetic disk storage unit and an enlarged schematic view of a magnetic head mounted on the unit.

The U-shaped guide portion 10b of linear slide guide, which is a movable part of the linear bearing, is provided with the workpiece holding device 3 so that the workpiece holding jig 2 can be removed easily. FIG. 6 is a detailed view of the workpiece holding device 3. A groove is formed at the lower part of the workpiece holding device 3, and the workpiece holding jig 2 is inserted in this groove and is fixed by means of headless screws. Thus, by making the member for directly holding the workpiece 1 a small separate part that is removable, the workpiece can be installed to the jig very easily, and the lapping operation efficiency can be increased significantly by preparing a plurality of workpiece holding jigs 2.

The lower face (face opposed to the lapping plate 8) of the workpiece holding jig 2 is mirror finished by lapping. The flatness is not more than 1 $\mu$m. To this lower face, an adhesive elastic member 13, which is an adhesive rubber-like elastic sheet with a thickness of about 2 mm, is affixed, and further a magnetic head slider bar, which is the workpiece 1, is affixed. By interposing such a rubber-like elastic sheet, even if displacement with a long period (swell component) occurs in the lengthwise direction of slider bar, the displacement is absorbed by the elastic deformation of slider bar itself and the deformation of rubber. As a result, the surface of slider bar to be lapped comes into close contact with the surface of the lapping plate unoformaly.

The rubber-like elastic sheet does not necessarily have to be adhesive, but has only to fix the workpiece temporalily. Also, if the slider bar, which is the workpiece, has no deformation etc. in the lengthwise direction, the rubber-like elastic sheet does not necessarily have to be interposed. Both of these configurations are within the scope of the present invention.

Also, the workpiece holding device 3 is separately provided with a weight 11 for adjusting a lapping load. As shown in the figure, by making the weight 11 removable, the condition of lapping load can be changed easily, and the workpiece can be lapped under the optimum lapping conditions.

In the case where the slider bar, which is the workpiece, is lapped by the above-described lapping apparatus, it is important that the parallelism of the surface of workpiece to be lapped and the surface of lapping plate is adjusted with high accuracy, there are no rattles of component parts, the rigidity on the surface of workpiece to be lapped is high, and the rigidity is maintained during the lapping operation.

First, one example in which the above-described parallelism is adjusted with high accuracy will be described. The adjustment of parallelism in the lengthwise direction of workpiece is made by inserting a sheet-form pressure sensor (not shown) between the workpiece 1 and the lapping surface plate 8 before the lapping operation is performed, and by turning an angle adjustment knob (not shown) of the gonio-stage 4b while measuring the lengthwise pressure distribution in real time. The adjustment in the width direction is also made in the same way by turning an angle adjustment knob (not shown) of the gonio-stage 4a while using the pressure sensor. Also, in place of the above-described method, the parallelism of the lower face of the workpiece holding jig 2 and the surface of the lapping plate 8 may be adjusted in the same way between them.

Figure 17A:
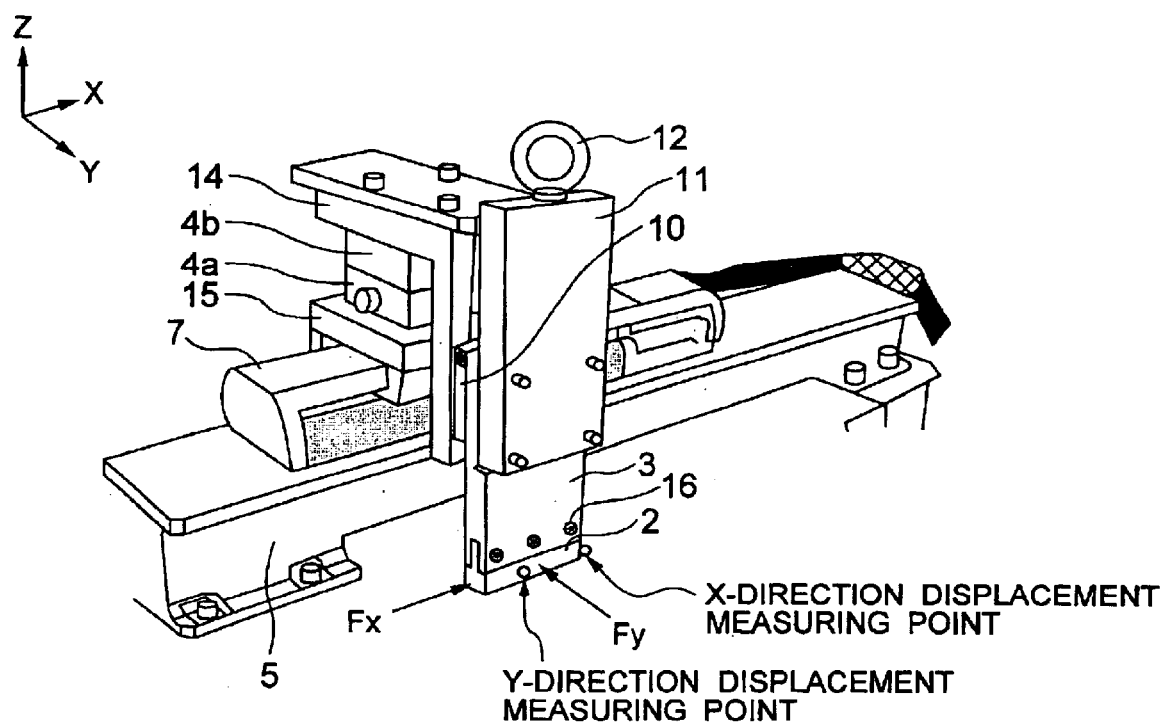
FIGS. 17A to 17C are explanatory views for illustrating the relationship between the rigidity of the apparatus in a portion in which a workpiece is installed and the precision of lapping in creating the air bearing surface of magnetic head, FIG. 17A being a perspective view showing a measuring method of rigidity, FIG. 17B being a diagram showing the relationship between the rigidity of the apparatus and the lapping amount distribution, and FIG. 17C being a diagram showing the relationship between the rigidity of the apparatus and the element recession.

Next, the relationship between the rigidity and the lapping accuracy of the surface of workpiece will be described. FIG. 17A shows a method of measuring the rigidity of the apparatus with respect to the displacement of the surface of the workpiece 1 to be lapped relative to the base of the workpiece holding device assembly, i.e., the slider table 15. Application points of loads (Fx and Fy in FIG. 17A) and measurement points of rigidity (X-direction displacement measurement point and Y-direction displacement measurement point in FIG. 17A) were set in the position of the workpiece holding jig 2. Also, the Z-axis was set so as to be the same orientation as that at the time of actual lapping operation. Pressing forces Fx and Fy were measured by using, for example, a spring balance, and the displacement at the time when the pressing forces are applied was measured by using a displacement meter such as an electric micrometer or a laser displacement meter. The rigidity of the apparatus was calculated by using the relationship between the pressing force and the measured displacement, that is, rigidity (N/$\mu$m)=pressing force(N)/displacement ($\mu$m).

Figure 17B:
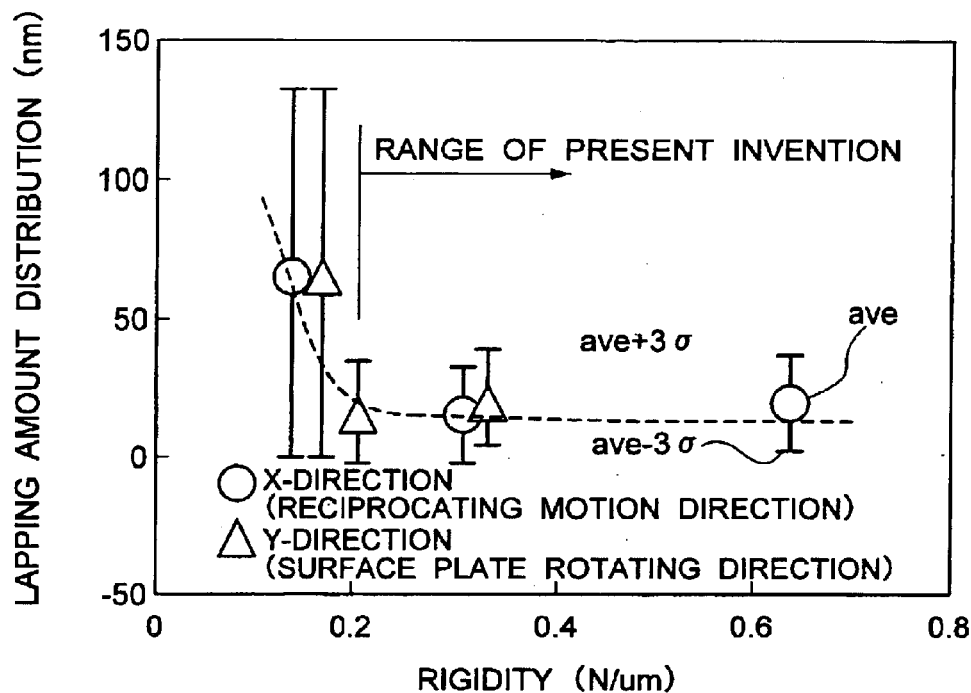
Figure 17C:
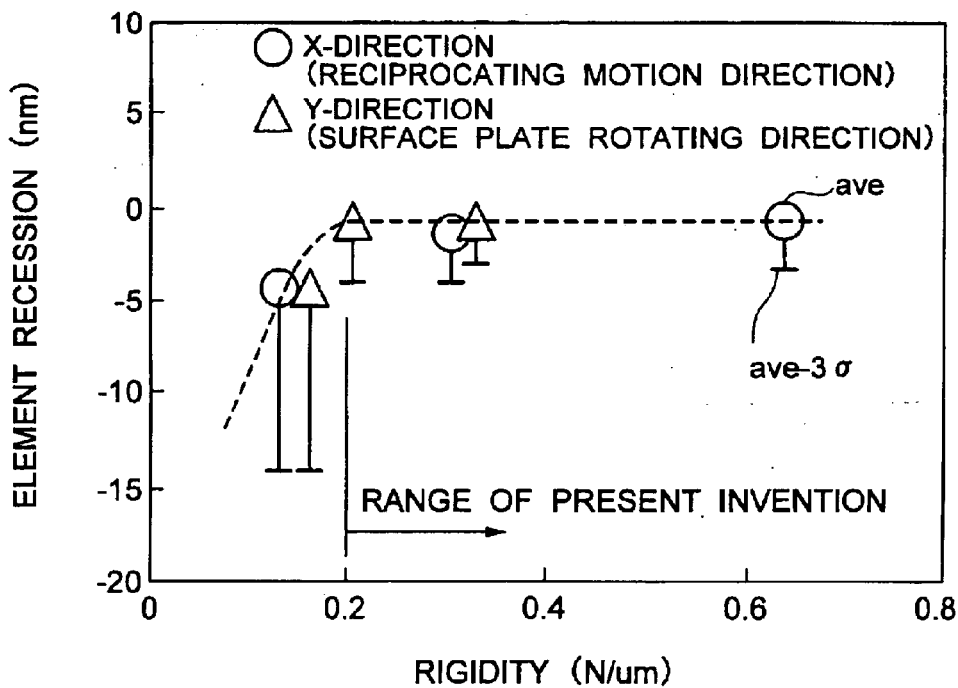

FIG. 17B shows the relationship between the rigidity of the apparatus and lapping amount, and FIG. 17C shows the relationship between the rigidity of the apparatus and the element recession. As apparent from these results, if the rigidity in the X direction (reciprocating motion direction) and the Y direction (surface plate rotating direction) is low, the variations in lapping amount and the element recession increase. The reason for this is thought to be that if the rigidity is low, the parallelism of the surface and the lapping plate is decreased by lapping resistance produced during the lapping operation, so that it becomes difficult to lap the surface of workpiece uniformly.

In this embodiment, therefore, in order for the rigidity in the X and Y directions of the workpiece holding jig 2 located at a position closest to the lapping point to be not less than 0.2 N/$\mu$m, the workpiece holding device 3, the L-shaped slider plate 14, the angle adjustment mechanism 4, the reciprocating motion drive unit 7, or the like were assembled so as not to produce a rattle, and these arrangements were held firmly on the bridge. Furthermore, for example, the L-shaped slide plate 14 was made thick (a thickness of not less than 10 mm), or was made of a highly rigid ceramic material. Also, contrivance was made such that the pre-load on the slide portion of the linear slide guide 10 was increased or a distance from the angle adjustment mechanism 4 to the lapping point was decreased to the utmost. As described above, by enhancing the rigidity on the surface, the lapping amount distribution and the element recession in the row bar can be decreased. As a result, a magnetic head with a small element recession on the air bearing surface capable of accommodating a low flying height of magnetic head can be manufactured.

In order to decrease the element recession on the air bearing surface of magnetic head, in addition to the above-described contrivance of lapping apparatus, it is necessary to consider the material selection and surface accuracy of the lapping plate and the properties of abrasives for lapping. Specifically, as the material of the lapping plate, a relatively soft metal formed of a tin-based alloy etc. is used. Regarding the surface accuracy of the surface plate, the surface must be finished with very high accuracy by machining. Also, in order to accelerate the draining of sludge produced during the lapping operation, lapping fluid, lubricating fluid, etc., grooves, for example, minute grooves (width: several tenth of $\mu$m, depth: several micrometers) like the ones on an analog record are formed on the surface of the lapping plate.

Figure 8:
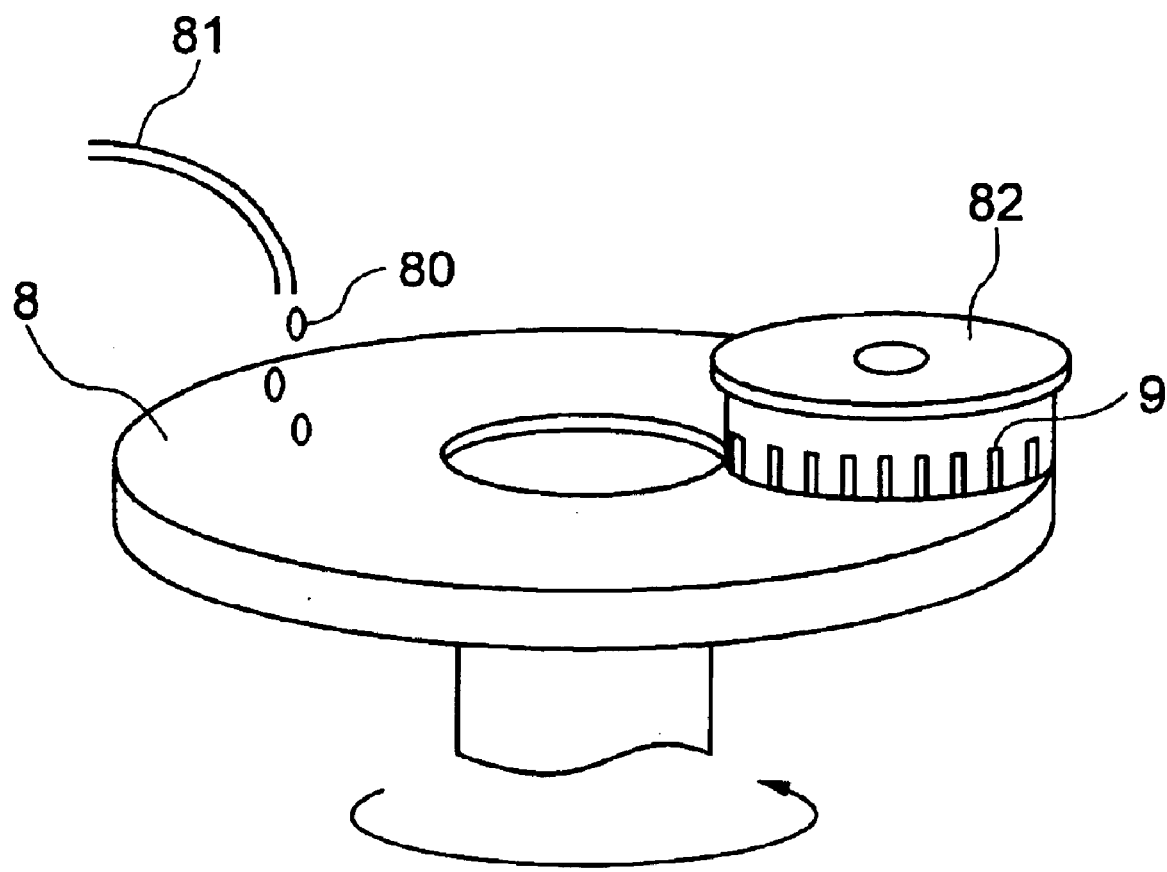
FIG. 8 is an explanatory view of for illustrating a lapping method using a rotary lapping plate.

A method in which fixed abrasives such as diamond abrasives are provided on the surface of the lapping plate 8 obtained as described above will be explained with reference to FIGS. 8 and 10A to 10C. In FIG. 8, while slurry fluid 80 containing diamond abrasives with a grain size of about 100 nm is dripped via a slurry supply tube 81, the ceramic ring (conditioning ring 9) having a weight 82 with a mass of about 10 kg is rotated and revolved.

Figure 10A:
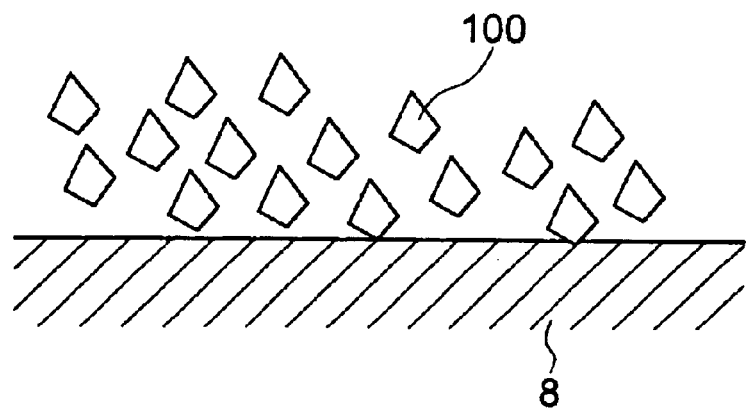
FIG. 10A is a view showing a state in which slurry fluid 80 is supplied onto a lapping plate 8 in a procedure in which abrasives are fixed onto a top surface of a lapping plate.
Figure 10B:
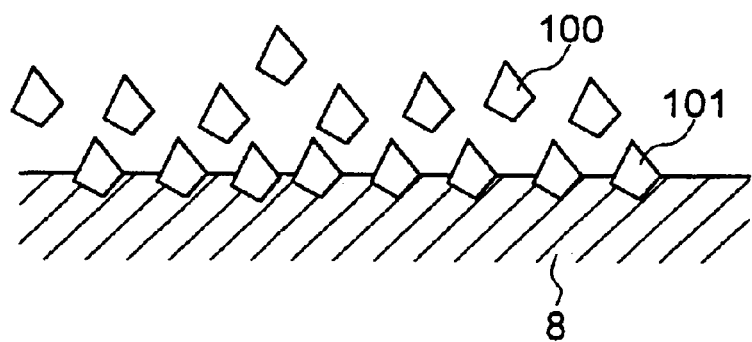
FIG. 10B is a view showing a state in which fixed abrasives 101 such as diamond abrasives are pressed in due to plastic deformation of a lapping plate, which is made of a soft material, in a state in which a part of the abrasive is exposed on the top surface of lapping plate in a procedure in which abrasives are fixed onto the top surface of a lapping plate.
Figure 10C:
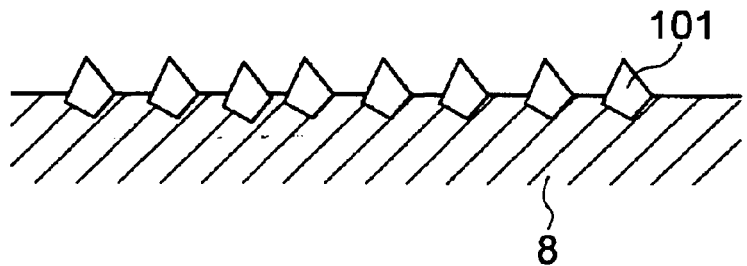
FIG. 10C is a view showing a state in which loose abrasives 100 are completely removed by using a rinsing liquid etc. containing a surface active agent.
Figure 11:
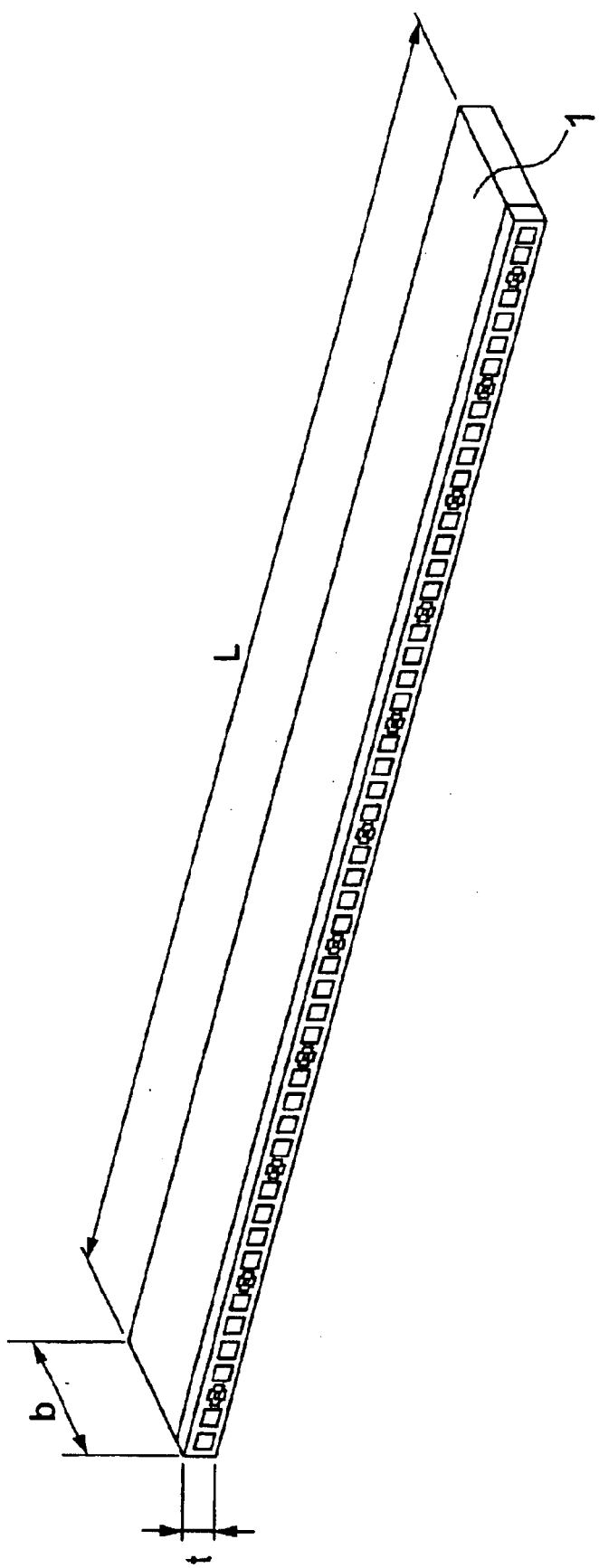
FIG. 11 is an explanatory view of a bar-like shaped magnetic head slider.

FIG. 10A shows a state in which the slurry fluid 80 is supplied onto the lapping plate 8. Fixed abrasives 101 such as diamond abrasives are pressed into the surface of the lapping plate by the conditioning ring 9. At this time, since the material of lapping plate is soft, the abrasives pressed in due to the plastic deformation of lapping plate are held therein as they are (FIG. 10B). The fixed abrasives 101 such as diamond abrasives embedded in the surface of the lapping plate are fixed in the state in which a part of the abrasive is exposed on the surface. Loose abrasives 100 or insufficiently embedded loose abrasives 100 are removed completely by using a rinsing liquid etc. containing a surface active agent (FIG. 10C).

The lapping plate 8 used exclusively for finish lapping, which has fixed abrasive grains 101, is completed through the above-described process. In this embodiment, abrasives other than those that have been embedded and fixed in the lapping plate, of the abrasives remaining on the surface of the lapping plate, are washed off sufficiently, and then the lapping plate is used for lapping operation. Therefore, this lapping plate is referred to as a "completely fixed abrasive grain lapping plate". By using this lapping plate used exclusively for finish lapping, finish lapping operation of a minute lapping amount of about 30 nm or smaller is performed.

After the above-described angle adjustment (parallelism) of the surface of workpiece to be lapped and the surface of lapping plate is made by using the completely fixed abrasive lapping plate prepared as described above, the workpiece is brought into contact with the lapping plate 8 and is lapped. In this embodiment, when the workpiece 1 is brought close to and into contact with the surface of the lapping plate 8, the lapping plate 8 is first rotated prior to the lapping operation, and the workpiece 1 is swayed by the reciprocating motion drive unit 7 (linear actuator) on the bridge 5. Thereafter, the workpiece 1 is brought into contact with the lapping plate 8, and the lapping operation is performed by sliding motion thereof. Thus, by rotating the completely fixed abrasive lapping plate before the contact of the workpiece 1 and by swaying the linear actuator, the lapping operation is started without going through a static friction state. By using such a procedure, the abrasives on the lapping plate do not stick too deeply into the workpiece, with the result that the occurrence of scratches can be decreased effectively.

As described above, by performing the lapping operation in which the rotation of the lapping plate 8 is combined with the swinging motion(reciprocating motion) along the bridge 5, the uppermost layer remaining on the surface of workpiece is removed, and thus the element recession and scratches at the magneto-resistive element can be eliminated almost completely or decreased.

Figure 12A:
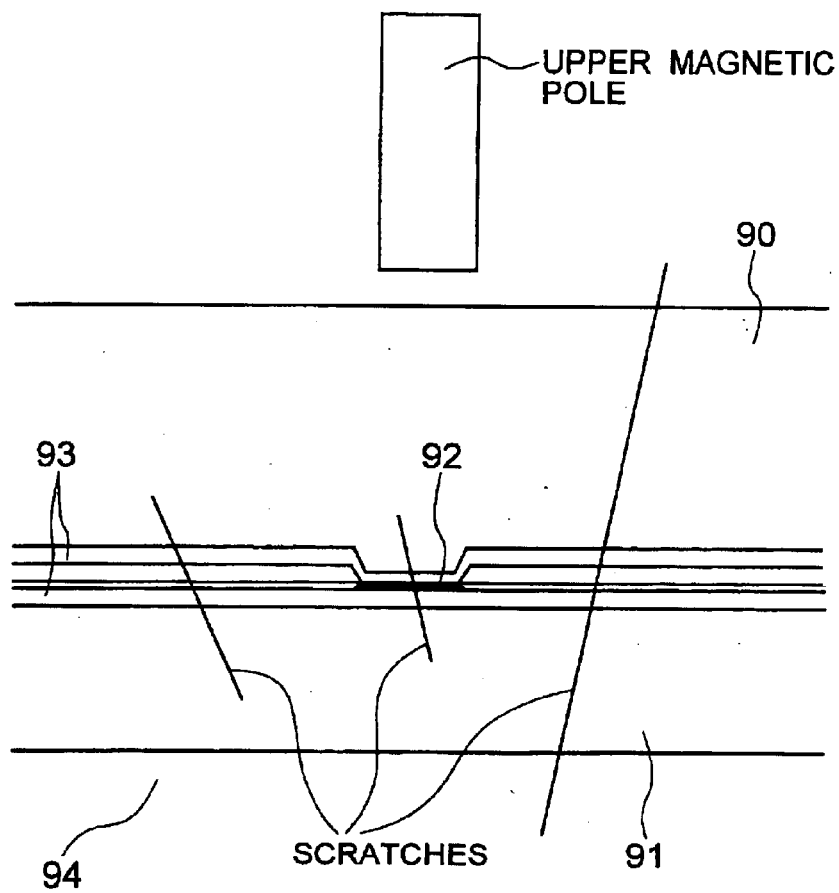
FIG. 12A is a schematic view of a air bearing surface of magnetic head and an explanatory view for illustrating the relationship with a lapping trace.

Furthermore, in this embodiment, in order to remove a lapping trace crossing the upper shield film 90 and lower shield film 91 or a lapping trace formed in the magneto-resistive element 92 as shown in FIG. 12A, only the reciprocating motion drive unit is operated for a short period of time after the rotation of the lapping plate 8 is stopped, by which final finish lapping operation of minute amount is performed. At the time when the lapping operation is finished, therefore, a lapping trace having a predetermined angle, herein a substantially parallel lapping trace remains as a trace in the shield films and magneto-resistive film.

Also, as another embodiment of the present invention, in order to remove the above-described lapping trace (scratch) crossing the magneto-resistive film 92, the final lapping operation of the workpiece 1 may be performed by additionally using the swaying motion caused by the reciprocating motion drive unit 7 (linear actuator) in the state in which the rotational rate of lapping plate is decreased as compared with that at the time of ordinary finish lapping.

Figure 12B:
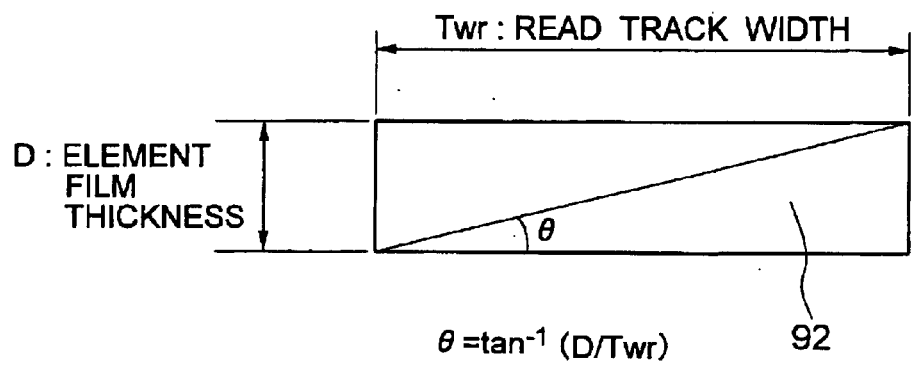
FIG. 12B is an enlarged view of a magneto-resistive element 92.

The above-described method will be explained with reference to FIG. 12B. FIG. 12B is an enlarged view of the magneto-resistive element 92. In this drawing, if a lapping trace remains in a form of crossing the element at the time when the lapping operation of the workpiece 1 is finished, a short-circuit path is developed between the upper and lower shields holding the GMR multi-layer film 92 therebetween. Therefore, if the angle of lapping trace at the time when the lapping operation is finished is an angle $\theta$ or smaller as shown in FIG. 12B, the lapping trace does not cross the element 92.

Therefore, the rotational rate of the lapping plate 8 at the time of final process must be adjusted to a speed such that a lapping trace remains which has an angle determined by the element film thickness D of the magneto-resistive element 92 and the read track width Twr of $\theta$ or smaller. For example, when the element film thickness D of the magneto-resistive element 92 is 24 nm, and the read track width Twr is 300 nm, the angle $\theta$ is equal to 4.57°. Also, the results of various experiments revealed that a lapping trace having an angle determined by the element film thickness D and a length five times the read track width Twr (about $\theta/5$) did not form a short-circuit path. It is desirable that the rotational rate of the lapping plate 8 and the reciprocating speed of the workpiece 1 are adjusted so that the angle of lapping trace is in the range of 0° to $\theta/5$.

On the other hand, when the lapping operation is finished, the workpiece 1 is separated from the surface of the lapping plate 8 in the state in which the reciprocating motion of the workpiece 1 with respect to the surface plate 8 is being performed. By this operation, the pressing-in of abrasive grains in the same locations on the surface of the workpiece 1 and the resultant deterioration in surface smoothness of the workpiece 1 can be avoided.

Figure 13:
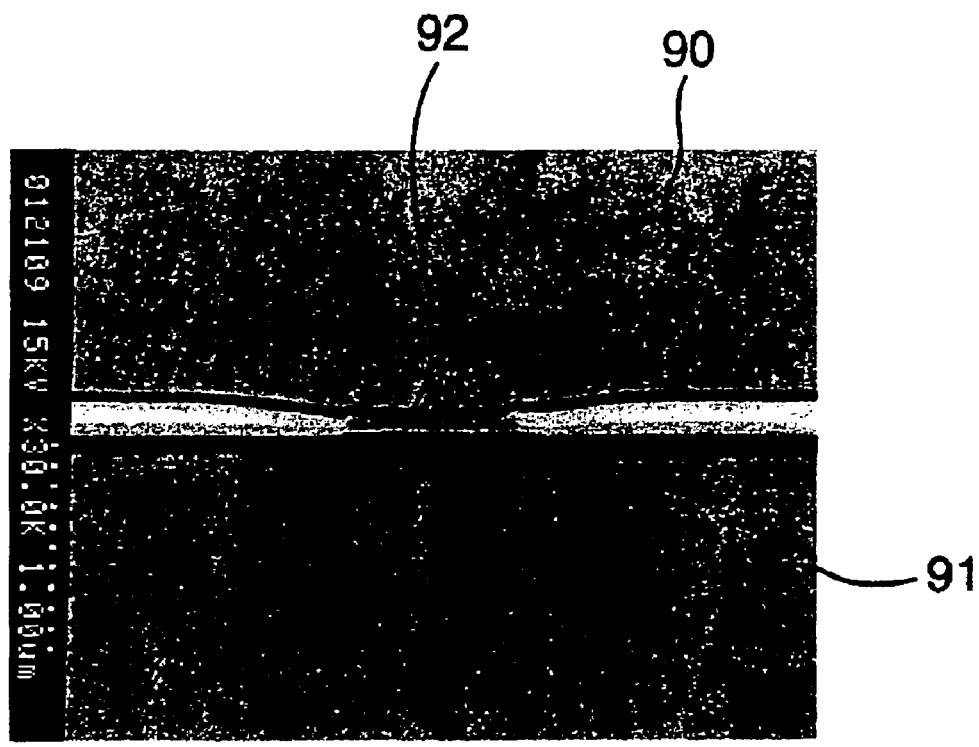
FIG. 13 is a photograph showing an example of lapping operation in accordance with one embodiment.

FIG. 13 shows one example in the case where the air bearing surface of thin-film magnetic head is lapped by using the above-described lapping apparatus. As apparent from this electron microphotograph (secondary electron image), a phenomenon that a scratch crossing the shield film, which had often been observed in the prior art, and a component material of magnetic head remained was not recognized, and a very smooth air bearing surface could be realized. Although the photograph of FIG. 13 is unclear, a stripe-shaped lapping trace parallel with the shield film or the magneto-resistive film can be observed. Also, the surface roughness Rmax (shield portion) of the air bearing surface shown in FIG. 13 is 7.9±6.1 nm, which is far smaller than 14.4±9.7 nm in the case where the lapping operation is performed by the prior art.

Figure 14A:
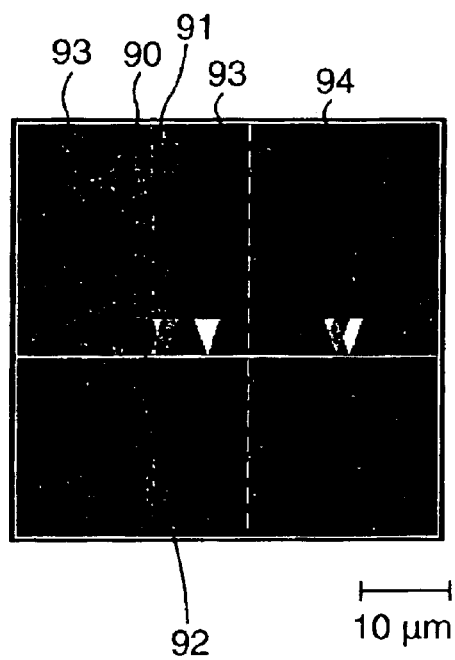
FIGS. 14A to 14D show results of evaluation of surroundings of a magneto-resistive element of lapped surface made by using an AFM, FIG. 14A being an AFM image showing a result obtained by the present invention, FIG. 14B being a sectional profile of AFM image obtained in FIG. 14A, FIG. 14C being an AFM image in the case where a prior art is used as a comparative example, and FIG. 14D being a sectional profile of AFM image obtained in FIG. 14C.
Figure 14C:
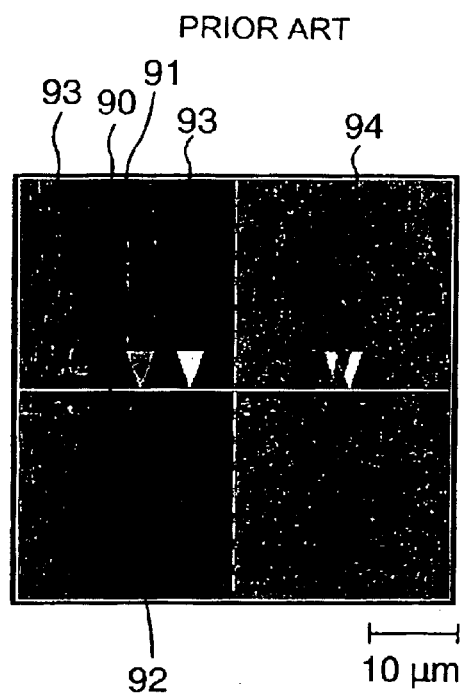
Figure 14B:
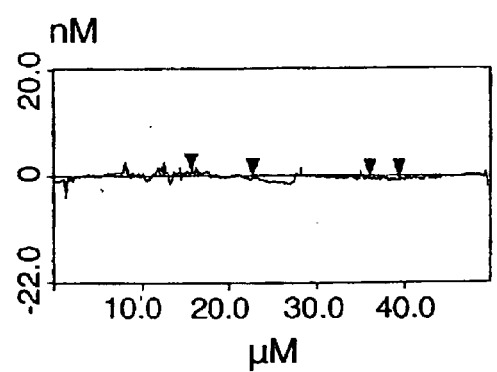
Figure 14D:
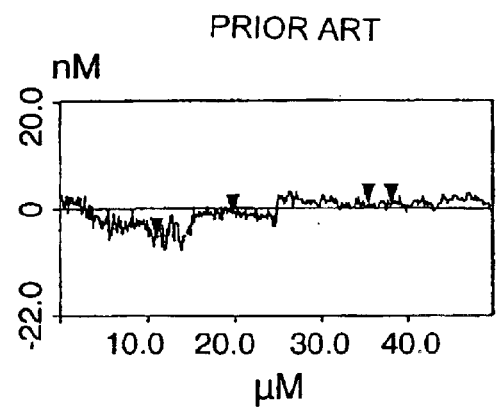

FIGS. 14A to 14D show results of evaluation of the surroundings of magneto-resistive element of lapped surface made by using an AFM (atomic force microscope). The result obtained in this embodiment was shown by an AMF image (FIG. 14A) and a sectional profile thereof (FIG. 14B). As a comparative example, the result obtained by using the prior art was shown by an AMF image (FIG. 14C) and a sectional profile thereof (FIG. 14D).

In the prior art, the right half of FIG. 14C shows a ceramic substrate 94 ($Al_2O_3$—TiC) of slider, and on the left half of the drawing, two dark stripes indicate the upper shield 90 and the lower shield 91 from the left to the right, and a portion other than these stripes indicates an alumina insulating film 93. As can be seen from the sectional profile in FIG. 14D, the upper and lower shield portions formed of a relatively soft metal are affected by free abrasive grains, and are lapped more deeply than the ceramic substrate portion 94 and the alumina insulating film portion 93 (level difference: 8.5 nm). Also, the alumina insulating film portion 93 is also subjected easily to erosion of abrasives as compared with the ceramic substrate 94, so that the relative lapping amount thereof is larger than the ceramic substrate 94.

On the other hand, in this embodiment, as apparent from FIGS. 14A and 14B, the lapped state of the air bearing surface is very satisfactory as compared with the prior art. Specifically, the element recession caused by a difference in material forming the magnetic head is very small. The level difference between the ceramic substrate 94 and the shield portions 90 and 91 is not more than 1 nm.

Considering the lapping efficiency, the air bearing surface of magnetic head is often lapped in a form of row bar, which is a state in which a plurality of magnetic heads run in a line. Therefore, on lapping the air bearing surface, it is indispensable to make the lapping amount in the row a predetermined amount uniformly.

Figure 15:
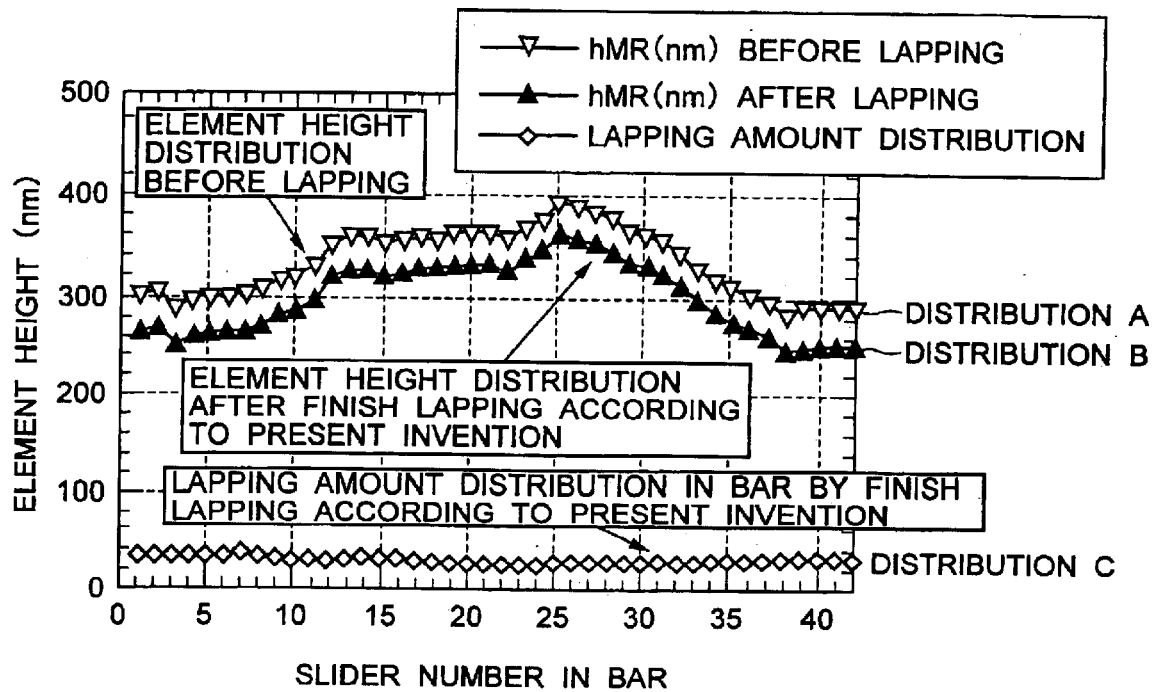
FIG. 15 is a diagram showing an example of element height distribution before and after lapping operation and lapping amount distribution in a row bar.

FIG. 15 shows an example in which the element height distribution after pre-lapping in the prior art (distribution A), the element height distribution after lapping when lapping operation is performed by using the above-described lapping apparatus (distribution B), and the local lapping amount for each slider determined from a difference in element height distribution before and after the finish lapping operation (distribution C) are plotted against the position of each slider on the row bar. As is apparent from this figure, since the element height distribution after pre-lapping was such that the mean value of element height was 331.9 nm and the standard deviation thereof was 34.7 nm, the lapping operation was performed so that the mean value of element height was 300 nm at the time when the finish lapping operation was finished, in other words, the lapping amount of the finish lapping operation was 30 nm on average.

As a result, the distribution of lapping amount of this embodiment was such that the mean value was 30.7 nm and the standard deviation was 2.9 nm. A result such that the mean value of element height in the row bar was 301.2 nm and the standard deviation thereof was 37 nm was obtained. Although the variations in element height distribution increased about 6% in standard deviation, these variations were judged to be within the allowable range. The reason for this is that by the improvement in smoothness of the slider air bearing surface made by using this embodiment, the lapping yield is improved, and the magnetic performance, which is most important as a magnetic head, can be made uniform.

Figure 16:
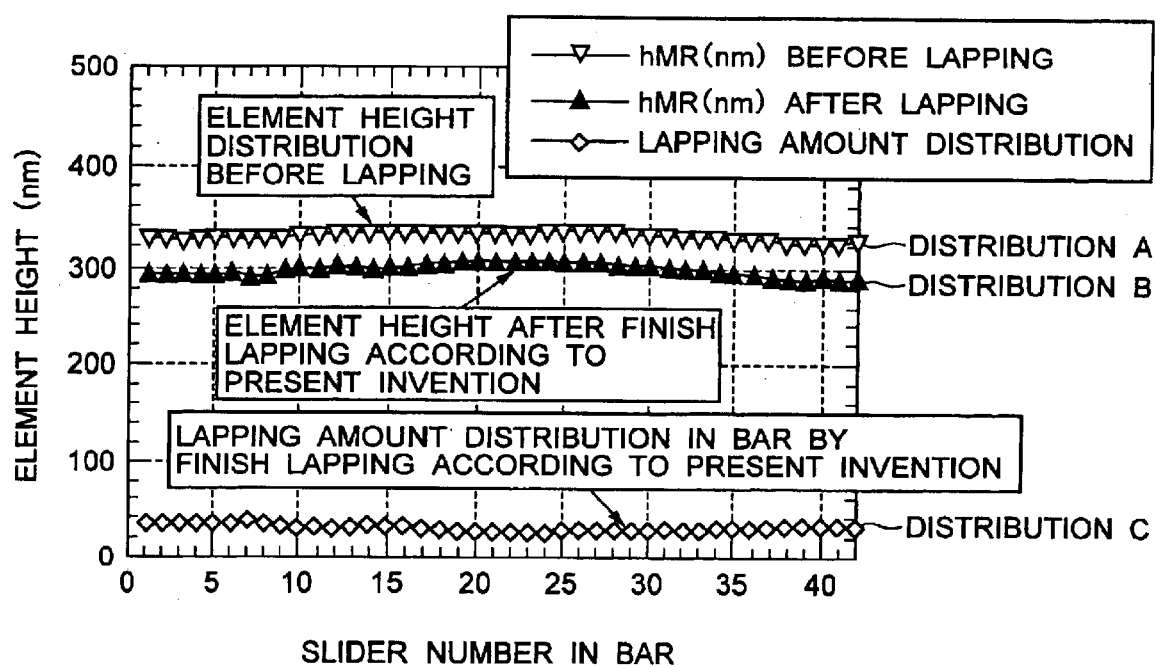
FIG. 16 is a diagram showing an example of element height distribution before and after lapping operation and lapping amount distribution in a row bar.

FIG. 16 shows an example showing a case where the element height distribution in the row bar is relatively small at the stage at which the pre-lapping process (rough lapping process) has been finished. When the air bearing surface of magnetic head slider was lapped by using the above-described lapping apparatus, as in the case shown in FIG. 15, a substantially constant lapping amount in the row bar could be realized. At the stage at which the pre-lapping process (rough lapping process) has been finished, although some shape displacement (swell component) exists in the lengthwise direction of row bar, a substantially constant lapping amount can be obtained by using the above-described workpiece holding mechanism.

As described above, the workpiece holding device to which a workpiece is installed is firmly attached to the reciprocating motion drive unit via the L-shaped slider plate and the angle adjustment mechanism, and the reciprocating motion drive unit is firmly attached to the bridge disposed so as to stride the lapping surface plate, by which the rigidity of the apparatus with respect to the displacement at the surface of the workpiece to be lapped can be enhanced as compared with the prior art.

When the air bearing surface of thin-film magnetic head is lapped by using the above-described lapping apparatus, the element recession measured as the level difference between the substrate and the shield film or magneto-resistive film can be kept very small, and a scratch that impairs the characteristics of magnetic head can be removed.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

What is claimed is:

1. A method of manufacturing a magnetic head in which a workpiece having a plurality of magnetic heads is lapped on a lapping plate, the method comprising:
attaching firmly a workpiece holding device for installing said workpiece to an angle adjustment mechanism and attaching firmly a reciprocating motion drive unit mounting said angle adjustment mechanism to a bridge provided so as to stride said lapping plate, to enhance rigidity between a surface of said workpiece to be lapped and a surface of said lapping plate; and
during the time when the surface of said workpiece to be lapped is lapped by using at least the reciprocating motion of said workpiece or the rotating motion of said lapping plate, keeping substantially constant an angle between the surface of said workpiece and the surface of said lapping plate in said angle adjustment mechanism so as to lap said workpiece.

2. A method of manufacturing a magnetic head in which a workpiece having a plurality of magnetic heads is lapped on a lapping plate, the method comprising:
attaching firmly a workpiece holding device for installing said workpiece to an angle adjustment mechanism and attaching firmly a reciprocating motion drive unit mounting said angle adjustment mechanism to a bridge provided so as to stride said lapping plate, to enhance rigidity between a surface of said workpiece to be lapped and a surface of said lapping plate; and
during the time when the surface of said workpiece to be lapped is lapped by using at least the reciprocating motion of said workpiece or the rotating motion of said lapping plate, keeping substantially parallel the surface of said workpiece and the surface of said lapping plate in said angle adjustment mechanism with each other.

3. The method of manufacturing a magnetic head according to claim 1, wherein workpiece to be lapped is lapped by using fixed abrasives such that a part of abrasive is embedded in said lapping plate and remaining portion thereof is exposed on said lapping plate.

4. The method of manufacturing a magnetic head according to claim 2, wherein said workpiece to be lapped is lapped by using fixed abrasives such that a part of abrasive is embedded in said lapping plate and remaining portion thereof is exposed on said lapping plate.

5. The method of manufacturing a magnetic head according to claim 1, wherein said method further comprises a process of lapping in which said workpiece to be lapped is lapped by using reciprocating motion of said workpiece while the rotational rate of said lapping plate is decreased to a predetermined range.

6. The method of manufacturing a magnetic head according to claim 2, wherein said method further comprises a process of lapping in which said workpiece to be lapped is lapped by using reciprocating motion of said workpiece while the rotational rate of said lapping plate is decreased to a predetermined range.

7. A method of manufacturing a magnetic head in which a workpiece having a plurality of magnetic heads is lapped on a lapping plate, the method comprising a process of lapping in which the surface of said workpiece to be lapped is lapped by using at least the reciprocating motion of said workpiece or the rotating motion of said lapping plate,
wherein when said workpiece is brought close to and in contact with the surface of said lapping plate, said lapping plate is rotated and said workpiece is reciprocated prior to lapping operation, subsequently lapping operation being performed by the sliding motion of said workpiece on said lapping surface plate by bringing said workpiece into contact with said lapping plate, and at the time when lapping operation is finished, said workpiece is separated from said lapping plate while the reciprocating motion of said workpiece is maintained.

8. A method of manufacturing a magnetic head in which a workpiece having a plurality of magnetic heads is lapped on a lapping plate, the method comprising a process of lapping in which the surface of said workpiece to be lapped is lapped by using at least the reciprocating motion of said workpiece or the rotating motion of said lapping plate, wherein during the time when said process of lapping is being performed, said workpiece is lapped while the surface of said workpiece and the surface of said lapping plate are kept substantially parallel with each other, and wherein when said workpiece to be lapped is brought close to and in contact with the surface of said lapping plate, said lapping plate is rotated and said workpiece is reciprocated prior to lapping operation, subsequently lapping operation being performed by the sliding motion of said workpiece on said lapping plate by bringing said workpiece into contact with said lapping plate, and at the time when lapping operation is finished, said workpiece is separated from said lapping surface plate while the reciprocating motion of said workpiece is maintained.

9. A method of manufacturing a magnetic head in which a workpiece having a plurality of magnetic heads is lapped on a lapping plate, comprising a process of lapping in which the surface of said workpiece to be lapped is lapped by using at least the reciprocating motion of said workpiece or the rotating motion of said lapping plate, wherein during the time when said process of lapping is being performed, said workpiece is lapped while an angle between the surface of said workpiece and the surface of said lapping plate is kept substantially constant, and wherein when said workpiece is brought close to and in contact with the surface of said lapping plate, said lapping plate is not rotated and said workpiece is reciprocated prior to lapping operation, subsequently lapping operation being performed by the sliding motion of said workpiece on said lapping surface plate by bringing said workpiece into contact with said lapping plate, and at the time when lapping operation is finished, said workpiece is separated from said lapping plate while the reciprocating motion of said workpiece is maintained.

10. A method of manufacturing a magnetic head in which a workpiece having a plurality of magnetic heads is lapped on a lapping plate, comprising a process of lapping in which the surface of said workpiece to be lapped is lapped by using at least the reciprocating motion of said workpiece or the rotating motion of said lapping plate, wherein during the time when said process of lapping is being performed, said workpiece is lapped while the surface of said workpiece and the surface of said lapping plate are kept substantially parallel with each other, and wherein when said workpiece to be lapped is brought close to and in contact with the surface of said lapping plate, said lapping plate is not rotated and said workpiece is reciprocated prior to lapping operation, subsequently lapping operation being performed by the sliding motion of said workpiece on said lapping plate by bringing said workpiece into contact with said lapping plate, and at the time when lapping operation is finished, said workpiece is separated from said lapping surface plate while the reciprocating motion of said workpiece is maintained.

11. The method of manufacturing a magnetic head according to claim 1, wherein said rigidity is not less than 0.2 N/$\mu$m.

12. The method of manufacturing a magnetic head according to claim 2, wherein said rigidity is not less than 0.2 N/$\mu$m.

13. The method of manufacturing a magnetic head according to claim 1, said method additionally comprises a process of lapping in which said workpiece to be lapped is lapped by using reciprocating motion of said workpiece while the rotational rate of said lapping plate is decreased to zero.

14. The method of manufacturing a magnetic head according to claim 2, said method additionally comprises a process of lapping in which said workpiece to be lapped is lapped by using reciprocating motion of said workpiece while the rotational rate of said lapping plate is decreased to zero.

* * * * *